3,237,733
BRAKE SHOE KEY AND LOCK
James H. Kettering, Irwin, and Robert B. Salton, Monroeville, Pa., assignors to Westinghouse Air Brake Company, Wilmerding, Pa., a corporation of Pennsylvania
Filed Feb. 11, 1964, Ser. No. 344,021
6 Claims. (Cl. 188—243)

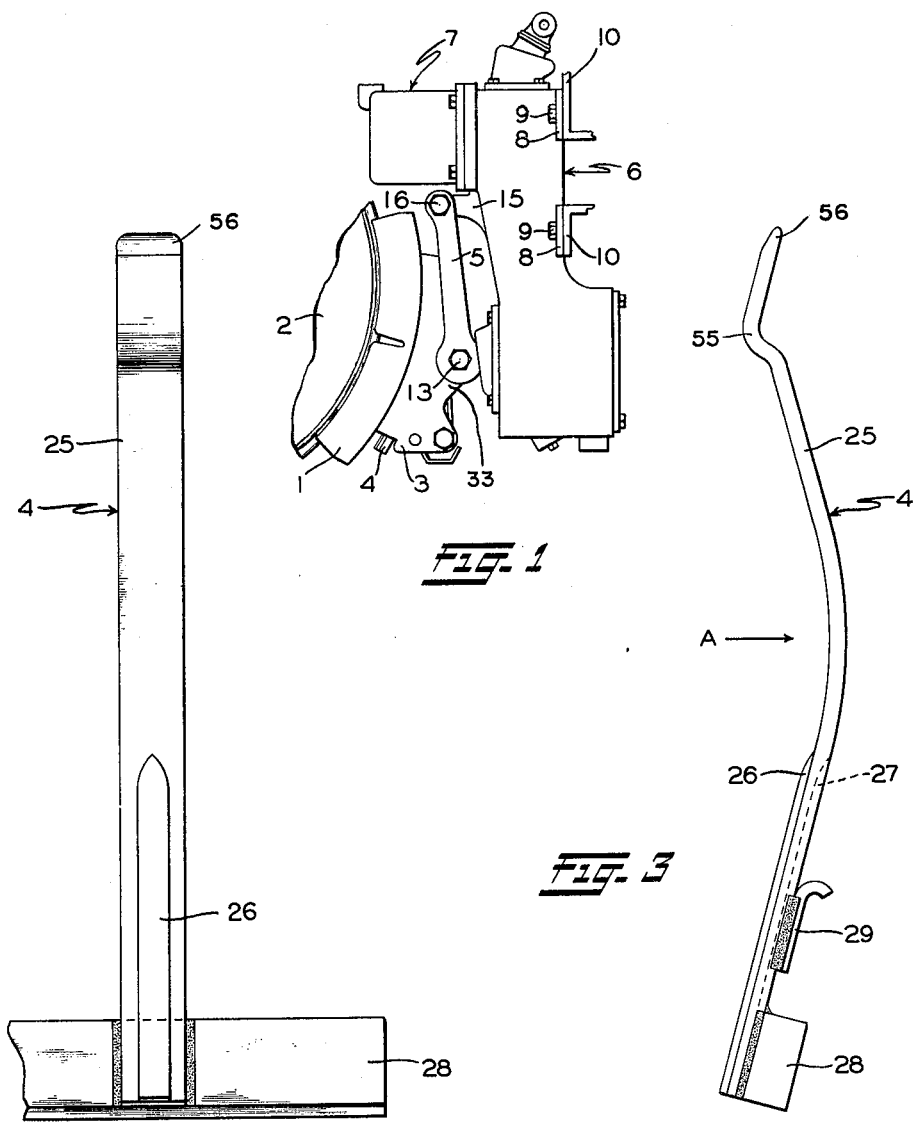

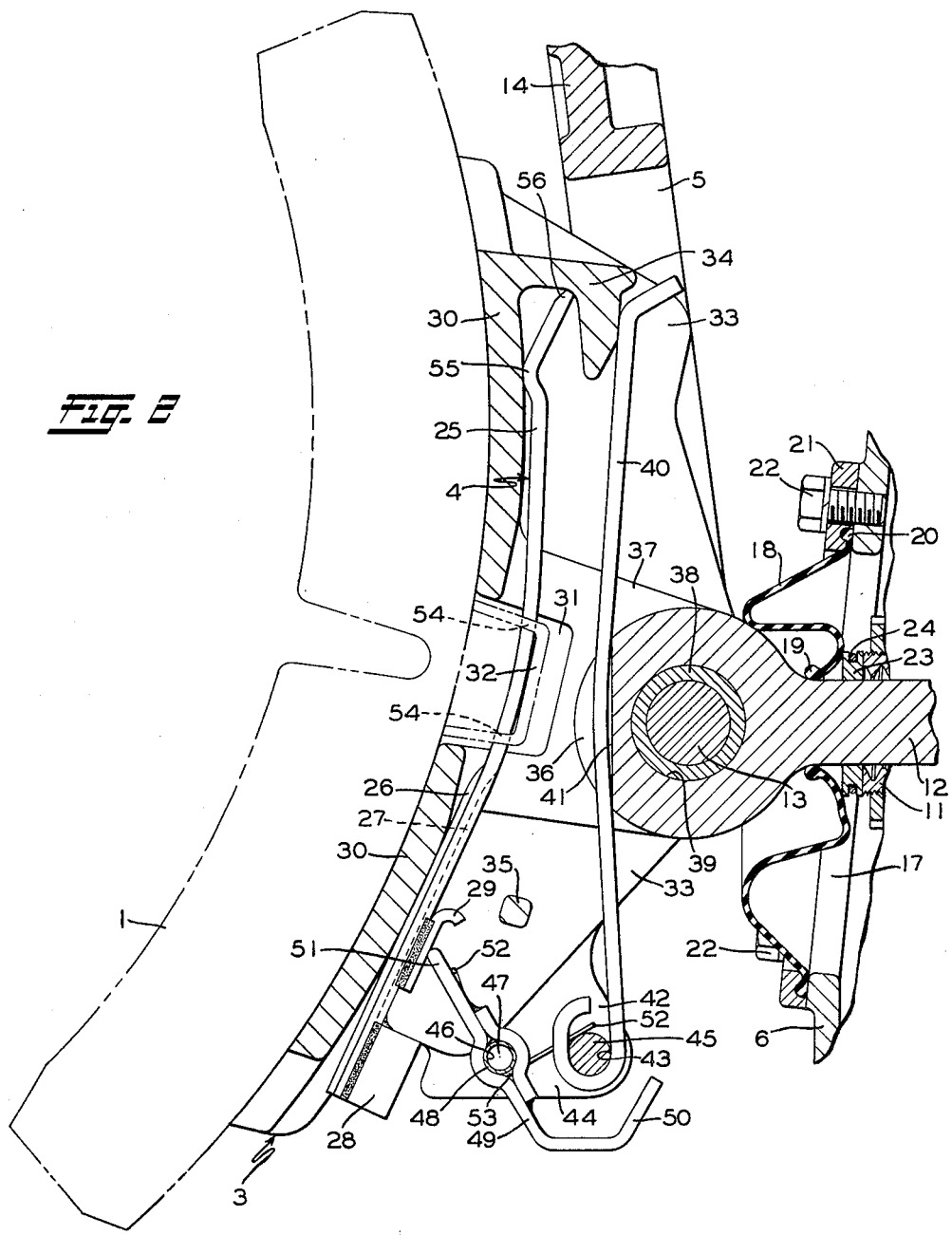

This invention relates to a tread brake assembly for railway rolling stock and, more particularly, to a brake shoe key and lock for securing a brake shoe to a brake head of a tread brake assembly of the "package" type wherein the entire mechanism is self-contained and installable and removable as a unit on the truck frame of a railway vehicle.

A brake assembly of the above-mentioned type is described and claimed in Patent No. 2,940,554, issued June 14, 1960, to Mortimer B. Cameron and assigned to the assignee of this application. The brake shoe key for securing the brake shoe to the brake head of the brake assembly disclosed in the Cameron patent is inserted into the brake head from a position above the brake head.

Due to limitations of space on certain new types of railway cars, it has been found that a brake assembly constructed as shown in the Cameron patent cannot be installed in the space available. This has necessitated the design of a smaller and more compact brake assembly that can be installed in the space available on these new types of cars. The brake cylinder in this smaller and more compact brake assembly is so arranged as to be just above the top of the brake head and brake shoe carried thereby so that there is insufficient space for inserting and removing the brake shoe key from a position above the brake head.

Accordingly, it is the general purpose of this invention to provide a novel brake shoe key and lock for preventing removal and loss thereof, which brake shoe key can be inserted from a position below the brake head and between the bottom of the brake head and the top of the corresponding rail of the railway track upon which rests the railway car carrying the smaller and more compact brake assembly.

More particularly, according to the present invention, a novel brake shoe key is provided for securing a brake shoe to a brake head, which key embodies a T-shaped head secured to one end thereof to which hammer blows may be applied for forcing the brake shoe key upward through apertures in the key bridge of a brake shoe until the upper end of the key abuts a stop formed integral with the brake head to which the brake shoe is secured by portions of the key disposed on opposite sides of the key bridge, which portions are biased against the underside or inside of the shoe face of the brake head by the inherent resiliency of the brake shoe key which is constructed of some suitable material, such as, for example, spring steel.

The novel brake shoe key of the present invention further embodies a catch or hook secured thereto on the side thereof opposite the brake shoe and adjacent the one end of the key to which the T-head is secured. As the brake shoe key is forced upward in response to the application of hammer blows to its T-head, the catch or hook secured to the key is moved past the end of a spring-biased latch pivotally mounted on the brake head so that the brake shoe key cannot be removed by hammer blows applied to its T-head for forcing it downward and out of the key bridge of the brake shoe to remove the brake shoe from the brake head until the spring-biased latch is manually rotated to a position in which its end is out of the downward path of travel of the catch or hook.

In the accompanying drawings:

FIG. 1 is a side elevational view of a brake assembly embodying the invention showing the manner by which the assembly is mounted on a railway passenger car truck;

FIG. 2 is a vertical cross-sectional view of the brake shoe, brake head and brake rod of a brake assembly showing how the brake shoe is secured to the brake head by the novel brake shoe key of the present invention, which key is locked in place by a spring-biased latch carried by the brake head;

FIG. 3 is a side elevational view of the novel brake shoe key of the present invention; and FIG. 4 is an elevational view looking in the direction of the arrow "A" shown in FIG. 3.

Description

As shown in FIG. 1 of the drawings, a pneumatic brake assembly, one of which is provided for each wheel of a railway passenger car truck, is secured as by several cap screws to a pair of angle brackets carried by the frame of the truck.

The brake assembly, as shown in FIG. 1, comprises a brake shoe 1 for movement into braking contact with the tread surface of a wheel 2 of the car truck, a brake head 3 to which the brake shoe 1 is secured as by a brake shoe key 4, an external brake head hanger 5, and a support member illustrated as a casing comprising a main section 6 and a brake cylinder section 7.

Formed integral with the main section 6 is a pair of bosses 8 provided with several spaced-apart bores (not shown) for receiving a like number of cap screws 9 whereby the main section 6 is rigidly secured to a pair of angle brackets 10 attached, as by welding, to the passenger car truck frame (not shown).

Slidably operable in a bore (not shown) in the brake cylinder section 7 is a fluid pressure actuated brake applying piston that is connected by a linkage, movably supported in the main casing section 6, to the brake-shoe-carrying brake head 3, as fully described in the hereinbeforementioned Patent No. 2,940,554.

As described in detail in Patent No. 2,940,554, the above-mentioned linkage comprises a lever (not shown) that has a universal joint type of connection with an internally threaded sleeve member 11, a part of which appears in FIG. 2 of the drawings. A brake rod 12 threaded at one end has screw-threaded engagement with the internally threaded sleeve member 11, and at the other end is pivotally connected to one end of the brake head hanger 5 and the brake head 3, as by a bolt 13 and a nut (not shown). The brake head hanger 5 comprises two identical parallel links connected intermediate their ends by a web 14 formed integral therewith. The upper ends of the two parallel links are disposed respectively on opposite sides of a bracket 15 (FIG. 1) that is formed integral with the main casing section 6 and are suspended from the bracket 15, as by means of a bolt 16 which is secured against removal by a nut (not shown).

As shown in FIG. 2 of the drawings, the left-hand end of the brake rod 12 extends through an opening 17 in the left-hand wall of the main casing section 6 to the exterior thereof. In order to prevent the entrance of water, ice and dirt to the interior of the main casing section 6, a rubber boot 18 surrounds the opening 17 in the main casing section 6. The boot 18 is provided with an inner bead 19 which fits against the outer periphery of the brake rod 12 to form a seal therewith, and with an outer bead 20 that fits in a groove formed in one side of a boot retaining ring 21 that surrounds the opening 17 and is secured to the main casing section 6 by a plurality of cap screws 22.

Since the left-hand end of the sleeve member 11 is provided with external screw threads, in order to prevent damage to the boot 18 by these screw threads, a split type boot protector ring 23 surrounds the brake rod 12 and abuts the left-hand end of the sleeve member 11. The boot protector ring 23 is provided with a peripheral annular groove in which is disposed a protector retaining ring 24 which acts to cause the boot protector ring 23 to firmly grip the periphery of the brake rod 12 and thereby prevent movement of the protector ring 23 along the brake rod 12 by vibration.

Details of the novel brake shoe key 4 of the present invention are shown in FIGS. 3 and 4 of the drawings. As shown in FIGS. 3 and 4, the novel brake shoe key 4 is constructed of a long flat piece of preferably spring steel 25 that is first bent to the configuration, shown in FIG. 3, by a stamping operation. The dies used for this stamping operation are so constructed that there is formed on the respective opposite flat sides of the piece of spring steel 25 and adjacent one end thereof a raised portion 26 and a groove 27, the length of the raised portion being substantially the same as that of the groove. The purpose of providing the raised portion 26 and groove 27 adjacent one end of the brake shoe key 4 is to provide the key with rigidity as hammer blows are imparted to this end of the key when driving it into and removing it from the brake head 3 in a manner hereinafter explained.

After the long flat piece of spring steel 25 has been bent to the configuration shown in FIG. 3 of the drawings, a substantially flat rectangular head 28 of case hardened steel is secured to the one end and on one side thereof as by being welded thereto.

Next, a hook or catch 29 is formed by bending into substantially a semicircle one end of a flat piece of steel the width of which is substantially the same as that of the long flat piece of spring steel 25.

Subsequent to bending into substantially a semicircle the one end of the flat piece of steel constituting the catch 29, this catch is secured, as by welding, to the one side of the long flat piece of spring steel 25 in spaced-apart relation to the head 28 but in close proximity thereto.

The brake shoe key 4 comprising the bent flat piece of spring steel 25, the head 28 and the catch 29 is now ready to be used to secure the brake shoe 1 to the brake head 3, as shown in FIG. 2 of the drawings.

As shown in FIG. 2, the brake head 3 comprises a curved face 30 that extends in opposite directions from each side of a socket 31 formed in the brake head 3 for receiving a key bridge 32 of the brake shoe 1. Formed integral with and extending outward from the side of the face 30 opposite the side thereof against which rests the brake shoe 1 is a pair of parallel spaced-apart ribs 33, only one of which appears in FIG. 2 of the drawings. The two parallel spaced-apart ribs 33 are connected at their upper end by a spring stop in the form of a web 34 that is formed integral therewith and with the face 30. The two parallel spaced-apart ribs 33 are also connected near their lower end by a tie bar 35 that is also formed integral therewith.

A pair of oppositely arranged and inwardly facing bosses 36, one of which is partly shown in FIG. 2, are formed on the respective inside walls or faces of the ribs 33 each boss extending outward toward the other from a raised flat surface 37 formed integral with the corresponding inside wall of the rib 33 and extending across the rib to the face 30 as shown in FIG. 2. The bosses 36 are spaced from each other a distance slightly greater than the thickness of the left-hand end of the brake rod 12 so that this end may be positioned therebetween and pivotally connected to the brake head 3 by means of the bolt 13 which passes through a bushing 38 press-fitted into a bore 39 formed in the left-hand end of the brake rod 12 and a corresponding bushing press-fitted into a bore formed in each of the bosses 36.

In order to properly position the brake head 3 and brake shoe 1 carried thereby relative to the tread surface of the wheel 2 (FIG. 1), a flat brake head positioning spring 40 (FIG. 2) is provided. The brake head positioning spring 40 is placed between the two ribs 33 of the brake head 3 so that its upper end rests against the right-hand side of a downwardly extending portion of the web 34 as shown in FIG. 2. Then the lower portion of the flat positioning spring 40 is bent counterclockwise, as viewed in FIG. 2, about a flat surface 41 formed on the left-hand end of the brake rod 12 until a slot 42, formed at the lower end of the flat positioning spring by bending this lower end back upon itself, is in alignment with two coaxial bores 43 formed respectively in two parallel spaced-apart ears 44, only one of which appears in FIG. 2, that are formed integral with the parallel spaced-apart ribs 33 of brake head 3. While the flat positioning spring 40 is held in this position by any suitable means, a bolt 45 is inserted through the bores 43 in the ears 44 and the slot 42 formed at the lower end of the spring 40. The bolt 45 is retained against removal by a nut (not shown).

The parallel spaced-apart ears 44 are also provided with coaxial bores 46 in which is anchored the opposite ends of a pin 47. Carried on the pin 47 and extending between the two ears 44 is a wear bushing 48 on which is rockably mounted a latch member 49 having two arms 50 and 51 the arm 50 being bent to the configuration shown in FIG. 2 of the drawings. The latch member 49 is normally biased in a counterclockwise direction by a U-shaped wire spring 52. The U-shaped spring 52 is anchored on the wear bushing 48 which passes through two loops 53 one formed in each arm or side of the U-shaped spring 52 the outer end of which arm bears against the bolt 45, as shown in FIG. 2.

In order to secure the brake shoe 1 to the brake head 3, the key bridge 32 of the brake shoe 1 is placed within the socket 31 formed in the brake head 3 so that the right-hand side of the brake shoe 1 abuts the left-hand side of the face 30 of the brake head.

While the brake shoe 1 is held in the position shown in FIG. 2 by any suitable means, the brake shoe key 4, with its T-head 28 downward or nearest the rail of the railway track, is positioned so that the end thereof opposite the T-head 28 can be inserted through a pair of spaced-apart apertures 54 formed in the key bridge 32 of the brake shoe 1.

Next, by the application of hammer blows to the lower side of the T-head 28, as viewed in FIG. 2, the brake shoe key 4 is driven upward to the position shown in FIG. 2. The original configuration of the long flat piece of spring steel 25, as shown in FIG. 3 of the drawings, is such that, as the brake shoe key 4 is driven upward in response to hammer blows delivered to the lower side of the T-head 28, a rib 55 formed on the long flat piece of steel 25 a short distance inward from a tapered tip 56 abuts and moves or slides along the right-hand side of the face 30 above the socket 31 and the raised portion 26 abuts and moves or slides along the right-hand side of the face 30 below the socket 31 so that the piece of spring steel 25 is sprung in a manner to flatten out to the configuration shown in FIG. 2.

In this sprung flattened out position of the long flat piece of steel 25, that portion of it that extends between the two apertures 54 in the key bridge 32 of the brake shoe 1 is biased against that portion of the key bridge extending between the apertures 54 so that the brake shoe 1 is firmly held against the left-hand side of the face 30 of the brake head 3 so that there can be no movement between the brake head 3 and the brake shoe 1 carried thereby.

It will be noted from FIG. 2 that, as the brake shoe key 4 is driven upward by hammer blows delivered to the lower side of the T-head 28, subsequent to inserting the upper end of the key into the apertures 54 in the key bridge 32 of the brake shoe 1, the bent or semicircular end of the catch 29 carried by the key 4 first is moved into contact with the end of the arm 51 of the latch member 49 and thereafter, as the key 4 continues to be driven upward, is effective to rock the latch member 49 clockwise about the bushing 48, against the yielding resistance of the U-shaped wire spring 52, until the semicircular end of the catch 29 is moved upward past the end of the arm 51. Subsequent to the semicircular end of the catch 29 moving upward past the end of the arm 51 of the latch member 49, the U-shaped wire spring 52, which passes across the right-hand side of the arm 51 as shown in FIG. 2, is effective to rock the latch member 49 counterclockwise about the bushing 48 until the end of the arm 51 strikes the flat portion of the catch 29 below the semicircular end thereof. While the end of the arm 51 is thus disposed below the semicircular end of the catch 29, and biased against the flat portion of the catch 29 by the U-shaped wire spring 52, the catch 29 and arm 51 cooperate to prevent removal of the brake shoe key 4 from the brake head 3 and brake shoe 1 carried thereby.

Let it be supposed that the brake shoe 1 has worn out and it is desired to remove the worn brake shoe so that it can be replaced with a new brake shoe.

In order to remove the worn-out brake shoe 1 from the brake head 3, a repairman will insert the end of a flat pry bar between the lower end of the positioning spring 40 and the end of the bent arm 50 of the latch member 49, and thereafter, by rocking the pry bar clockwise, as viewed in FIG. 2, about the lower end of the positioning spring 40, effect clockwise rocking of the latch member 49 about the bushing 48 until the end of the arm 51 is in a position out of the path of travel of the semicircular end of the catch 29 of the brake shoe key 4.

The brake shoe key 4 can now be withdrawn from the brake head 3 and key bridge 32 of the brake shoe 1 by the application of a series of hammer blows to the upper side of the T-head 28 of the key 4, as viewed in FIG. 2. As hammer blows are thus applied to the upper side of the T-head 28, the brake shoe key 4 is forced or moved downward from the position in which it is shown in FIG. 2, the inherent resiliency of the long flat piece of spring steel 25 comprising the brake shoe key 4 causing the key to straighten out from its previously bent position in which it is shown in FIG. 2. As the flat piece of spring steel 25 straightens out, the rib 55 is moved out of contact with the right-hand side of the curved face 30 of the brake head 3, and that portion of the long flat piece of steel 25 that extends between the two apertures 54 in the key bridge 32 of the brake shoe 1 is moved out of contact with that portion of the key bridge extending between the two apertures 54. The brake shoe key 4 can now be easily moved downward until the upper end thereof is withdrawn from the key bridge 32. Thereafter the key 4 can be removed from between the two spaced-apart ribs 33 of the brake head 3.

Subsequent to removing the brake shoe key 4, the repairman will remove the end of the pry bar from between the lower end of the positioning spring 40 and the end of the bent arm 50 of the latch member 49, and also remove the worn-out brake shoe 1 from the brake head 3 by moving the brake shoe 1 in the direction of the left hand, as viewed in FIG. 2, away from the curved face 30 until the key bridge 32 is without the receptacle 31 in the brake head 3. The worn-out brake shoe 1 can then be discarded.

Upon removing the end of the pry bar from between the lower end of the positioning spring 40 and the end of the bent arm 50 of the latch member 49, the U-shaped wire spring 52 is rendered effective to rock the latch member 49 counterclockwise about the bushing 48 until the bent arm 50 of the latch member 49 is moved into contact with the lower end of the positioning spring 40 this lower end of the positioning spring 40 serving as a stop to prevent further counterclockwise rocking of the latch member 49.

The key bridge of the new brake shoe is now placed within the receptacle 31 formed in the brake head 3 so that the right-hand side of the new brake shoe abuts the left-hand side of the face 30 of the brake head.

The new brake shoe is now secured to the brake head 3 by means of the brake shoe key 4 in the manner hereinbefore described in detail.

Having now described the invention, what we claim as new and desire to secure by Letters Patent, is:

1. A railroad brake assembly comprising, in combination:
    (a) a brake head having a brake-shoe-receiving face that is provided substantially midway its ends with a socket, said brake head also having on the side thereof opposite said face a pair of spaced-apart parallel ribs each having an upper and a lower end, said upper ends being joined by an integral web,
    (b) a brake shoe having an apertured key bridge received in said socket of said brake head, and
    (c) a curved resilient brake shoe key having an upper and a lower end whereby its upper end can be forcibly insertable upwardly between the lower ends of said ribs of said brake head through said apertured key bridge for securing said brake shoe to said brake head, said key having at its lower end a T-head for receiving application of an upwardly directed force and adjacent its upper end and on one side thereof a rib which is so disposed that it travels along the said side opposite said face of said brake head in response to the application of force to said T-head until said upper end is moved into contact with said integral web to effect straightening out of said curved resilient brake shoe key whereby the portion of said key extending through said key bridge is effective through the intermediary of said key bridge to force said brake shoe against said brake-shoe-receiving face of said brake head.

2. A railroad brake assembly, as claimed in claim 1, further characterized by releasable locking means including a latch member pivotally mounted on said brake head, means biasing said latch member pivotally toward said key, and downwardly facing hook means on said key, said latch member being pivoted against the force of the biasing means by said hook means upon insertion of said brake shoe key and latched under said hook means for preventing accidental and undesired retraction downwardly of said brake shoe key caused by vibration or shock.

3. A railroad brake assembly, as claimed in claim 1, further characterized by a spring latched lock having a spring-biased keeper pivotally carried on said brake head and a hook carried on said brake shoe key under which said keeper engages for locking said brake shoe key upon movement past a chosen position to prevent undesired retraction of said brake shoe key subsequent to being forced past said chosen position.

4. A railroad brake assembly, as claimed in claim 3, further characterized by means formed integral with said keeper and manually actuatable to a position to render said spring latched lock ineffective to lock said brake shoe key whereby said key can be manually removed from said brake head and said brake shoe.

5. A railroad brake assembly, as claimed in claim 1, further characterized by a spring latched lock comprising:
    (a) a flat metallic strip bent into a semicircle at one end and secured to said brake shoe key adjacent said T-head,
    (b) a latch member pivotally mounted intermediate its ends on said brake head so as to form two arms, one disposed on each side of said pivot, and
    (c) spring means biasing said latch member in the direction to cause one of said arms thereof to be disposed in the path of the semicircular end of said flat metallic strip,
  (i) said latch member being rockable in one direction against the bias of said spring means by the semicircular end of said flat metallic strip upon the application of force to said T-head of said key in a first direction to secure said brake shoe to said brake head by said key until said semicircular end is forced past the exterior of said one arm whereupon said spring means is rendered effective to rock said latch member in an opposite direction to move the exterior end of said one arm into contact with said flat metallic strip whereby said latch member, while in this position, is effective to prevent removal of said key from said brake head and said brake shoe, and
  (ii) said latch member being also rockable in said one direction against the bias of said spring means by manual application of force to the other of said two arms to move said one arm to a position out of the path of the semicircular end of said flat metallic strip whereby said key can be withdrawn from said brake head and said brake shoe in response to the application of force to said T-head of said key in a direction opposite said first direction.

6. A brake shoe key of the spring steel type adapted to be inserted in a keyway formed in a brake head and through the key bridge of a corresponding brake shoe under tension in three-point contract between the key bridge of the brake shoe and two spaced points on the brake head, and comprising, when viewed in side elevation:
  (a) an elongated shank in the form of a flat resilient metallic strip having an intermediate portion of a shallow V-shape to afford a convex face and an opposed concave face each having a predetermined radius of curvature,
  (b) a T-head secured to one end of said flat resilient metallic strip, the length of said T-head exceeding the width of said metallic strip, said T-head being so disposed that its opposite ends overlie said strip, and
  (c) a hook element secured to said flat resilient metallic strip adjacent said head, said hook element comprising a flat rectangular metallic strip the longitudinal axis of which is disposed parallel to the longitudinal axis of said elongated shank, the end thereof remote from said T-head being bent into substantially a semi-circle to form a hook having its opening facing said T-head.

References Cited by the Examiner
UNITED STATES PATENTS

| | | | |
|---|---|---|---|
| 1,018,618 | 2/1912 | Huntoon | 188—243 |
| 1,304,044 | 5/1919 | Hawkins | 188—243 |
| 2,037,936 | 4/1936 | Simanek | 188—243 |
| 2,873,825 | 2/1959 | Prentice | 188—243 |

MILTON BUCHLER, *Primary Examiner.*

ARTHUR L. LA POINT, *Examiner.*